(12) United States Patent
Miller

(10) Patent No.: US 7,909,611 B2
(45) Date of Patent: Mar. 22, 2011

(54) METHOD FOR PREVENTING DAMAGE TO A MEMORY CARD

(75) Inventor: Robert C. Miller, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 27 days.

(21) Appl. No.: 12/239,093

(22) Filed: Sep. 26, 2008

(65) Prior Publication Data

US 2010/0081297 A1 Apr. 1, 2010

(51) Int. Cl.
*H01R 12/00* (2006.01)
(52) U.S. Cl. ............... 439/60; 439/680; 439/630
(58) Field of Classification Search .......... 439/60, 439/630, 680
See application file for complete search history.

(56) References Cited

U.S. PATENT DOCUMENTS

| | | | |
|---|---|---|---|
| 5,277,591 A * | 1/1994 | Felcman et al. ............ | 439/60 |
| 6,068,516 A | 5/2000 | Chang | |
| 6,112,994 A | 9/2000 | Hyland | |
| 6,126,464 A | 10/2000 | Chang | |
| 6,454,170 B1 | 9/2002 | Feeser | |
| 7,032,827 B2 | 4/2006 | Wang et al. | |
| 7,044,384 B2 | 5/2006 | Chen | |
| 7,044,797 B1 | 5/2006 | Lai | |
| 7,070,453 B1 | 7/2006 | Chen | |
| 7,267,561 B2 | 9/2007 | Lai et al. | |
| 7,340,540 B2 | 3/2008 | Miller et al. | |
| 7,364,471 B2 | 4/2008 | Takahashi et al. | |
| 2006/0079132 A1 | 4/2006 | Ko | |
| 2009/0104817 A1 | 4/2009 | Lai et al. | |
| 2010/0081315 A1 | 4/2010 | Miller et al. | |

OTHER PUBLICATIONS

Office Action dated Dec. 10, 2009, U.S. Appl. No. 12/239,109.
Response to Office Action filed Jun. 10, 2010 in U.S. Appl. No. 12/239,109.
Office Action dated Sep. 30, 2009 in U.S. Appl. No. 12/239,109.
Response to Office Action filed Oct. 26, 2009 in U.S. Appl. No. 12/239,109.
Notice of Allowance and Fee(s) Due dated Aug. 26, 2010 in U.S. Appl. No. 12/239,109.

* cited by examiner

*Primary Examiner* — Tho D Ta
*Assistant Examiner* — Travis Chambers
(74) *Attorney, Agent, or Firm* — Vierra Magen Marcus & DeNiro LLP

(57) ABSTRACT

A memory card connector, within a slot of a host device, for receiving a first memory card having a first row of contact fingers and a second row of contact fingers and a second memory card having only a single row of contact fingers. The memory card connector includes a first row of contact pins, a second row of contact pins and a protrusion. The first row of contact pins are configured to mate with the first row of contact fingers of the first memory card. The second row of contact pins are configured to mate with the second row of contact fingers of the first memory card. The protrusion is received within a contact finger in the second row of contact fingers of the first memory card to allow full insertion of the first memory card into the connector, and abuts against a distal end of one of the contact fingers of the second memory card to prevent full insertion of the second memory card into the connector.

20 Claims, 11 Drawing Sheets

METHOD FOR PREVENTING DAMAGE TO A MEMORY CARD

CROSS-REFERENCE TO RELATED APPLICATIONS

The following application is cross-referenced and incorporated by reference herein in its entirety: U.S. patent application Ser. No. 12/239,109, entitled "Connector Block Feature," by Robert Miller, filed the same day as the present application.

BACKGROUND

The strong growth in demand for portable consumer electronics is driving the need for high-capacity storage devices. Non-volatile semiconductor memory devices, such as flash memory storage cards, are becoming widely used to meet the ever-growing demands on digital information storage and exchange. Their portability, versatility and rugged design, along with their high reliability and large capacity, have made such memory devices ideal for use in a wide variety of electronic devices, including for example digital cameras, digital music players, video game consoles, PDAs and cellular telephones.

Electronic circuit cards, including non-volatile memory cards, have been commercially implemented according to a number of well-known standards. Such cards usually contain a re-programmable non-volatile semiconductor memory cell array along with a controller that controls operation of the memory cell array and interfaces with a host to which the card connected. Several of the same type of card may be interchanged in a host card slot designed to accept that type of card. However, the development of the many electronic card standards has created different types of cards that are incompatible with each other in various degrees. A card made according to one standard is usually not useable with a host designed to operate with a card of another standard.

FIG. 1 illustrates a conventional Secure Digital (SD) card 10. The SD card includes a leading edge 11, a trailing edge 15, a first side edge 17, a second side edge 19, and an angled edge 13 between the trailing edge 11 and the second side edge 19. According to the SD Memory Card specification, the card includes nine electrical contact fingers 12-28 located on a back surface 30 of the card 10. The nine contact fingers 12-28 are exposed via nine openings in the back surface 30 of the card 10.

A card reader is used to receive and connect with a memory card in order to deliver information between the memory card and an electrical device or host. There are many types of memory cards in the market today. There is a potential risk that a user may insert one type of memory card (e.g., conventional memory card 10) into a card reader configured to interface with a memory card according to a different standard. Inserting a memory card into memory card reader associated with a different standard may damage some of the contact pins in the memory card connector.

SUMMARY

One aspect of the present technology is to provide a memory card connector with a blocking feature to prevent a conventional memory card from being fully inserted into the memory card connector. The memory card connector has two rows of contact pins. One of the contact pins in the second row is replaced with a blocking feature that will abut the chamfered edge of the card housing before the memory card is inserted to the point where the card damages any of the contact pins in the first row of contact pins. The blocking feature also abuts the chamfered edge of the card housing before any of the contact pins in the second row of contact pins contacts the memory card housing. In other words, the blocking feature prevents a conventional memory card, which has been inserted into the memory card connector, from damaging any of the contact pins in the memory card connector. In an alternative embodiment, the memory card connector includes more than one blocking feature.

Another aspect of the present technology is to provide a memory card connector, within a slot of a host device. The memory card connector is configured for receiving a first memory card having a first row of contact fingers and a second row of contact fingers. In one embodiment, the memory card connector includes a first row of contact pins for mating with the first row of contact fingers, a second row of contact pins for mating with the second row of contact fingers, and a blocking feature. The blocking feature is received within a contact finger in the second row of contact fingers to allow full insertion of the first memory card into the memory card connector. The blocking feature also will abut against a distal end of one of the contact fingers of a second memory card that has only a single row of contact fingers to prevent full insertion of the second memory card into the memory card connector.

A further aspect of the present technology is to provide a card blocking apparatus for a memory card connector within a slot of a host device. The memory card connector includes a first row of contact pins and a second row of contacts pins. The memory card connector is capable of accepting a first memory card having a first row of contact fingers and a second row of contact fingers while preventing complete insertion of a second memory card having only a single row of contact fingers. In one embodiment, the card blocking apparatus includes a blocking feature that allows the first memory card to be inserted into the memory card connector until the first row of contact pins mate with the first row of contact fingers and the second row of contact pins mate with the second row of contact fingers. The blocking feature also prevents the second memory card from being fully inserted into the memory card connector by abutting against a distal end of a contact finger in the single row of contact pins before any of the second row of contact pins abuts against a distal end of a contact finger in the single row of contact fingers.

A still further aspect of the present technology is to provide a memory card reader system. In one embodiment, the system comprises a memory card and a memory card reader. The memory card includes a single row of contact fingers, each having a distal end. The memory card connector has a first row of contact pins, a second row of contact pins and a blocking element, the blocking element allows the memory card to be inserted into the memory card connector until the blocking element abuts the card housing at the distal end of one of the contact fingers. This way, the blocking element prevents further insertion of the memory card, which would damage the contact pins in the memory card reader.

BRIEF DESCRIPTION OF THE DRAWINGS

FIG. 16 depicts a cut-away side view of another embodiment of the blocking feature.

DETAILED DESCRIPTION

Embodiments will now be described with reference to FIGS. 2-16, which relate to a two-row memory card and a memory card connector for interfacing with the memory card. It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 2:
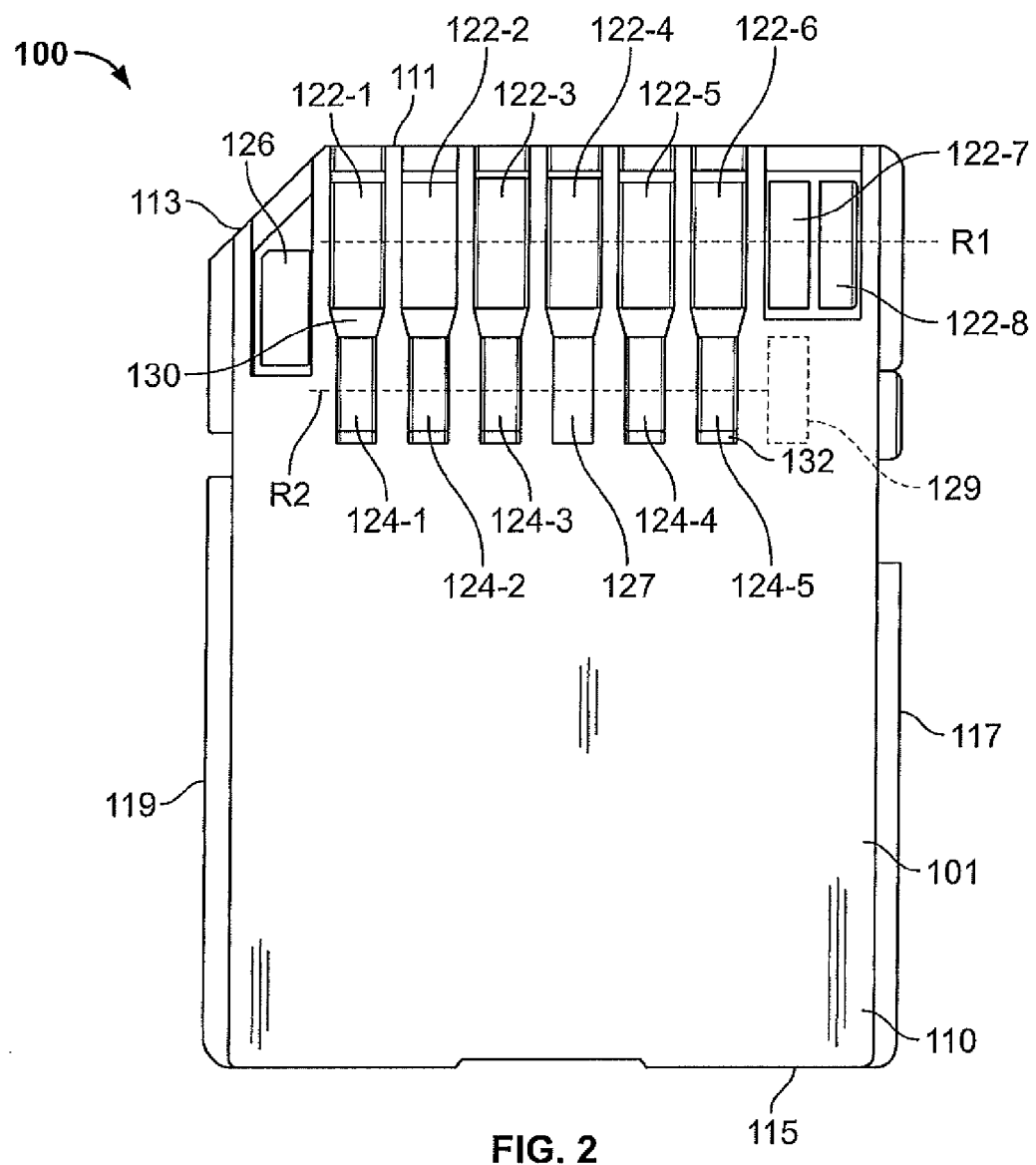
FIG. 2 depicts a plan view of an embodiment of a multi-row memory card.
Figure 3:
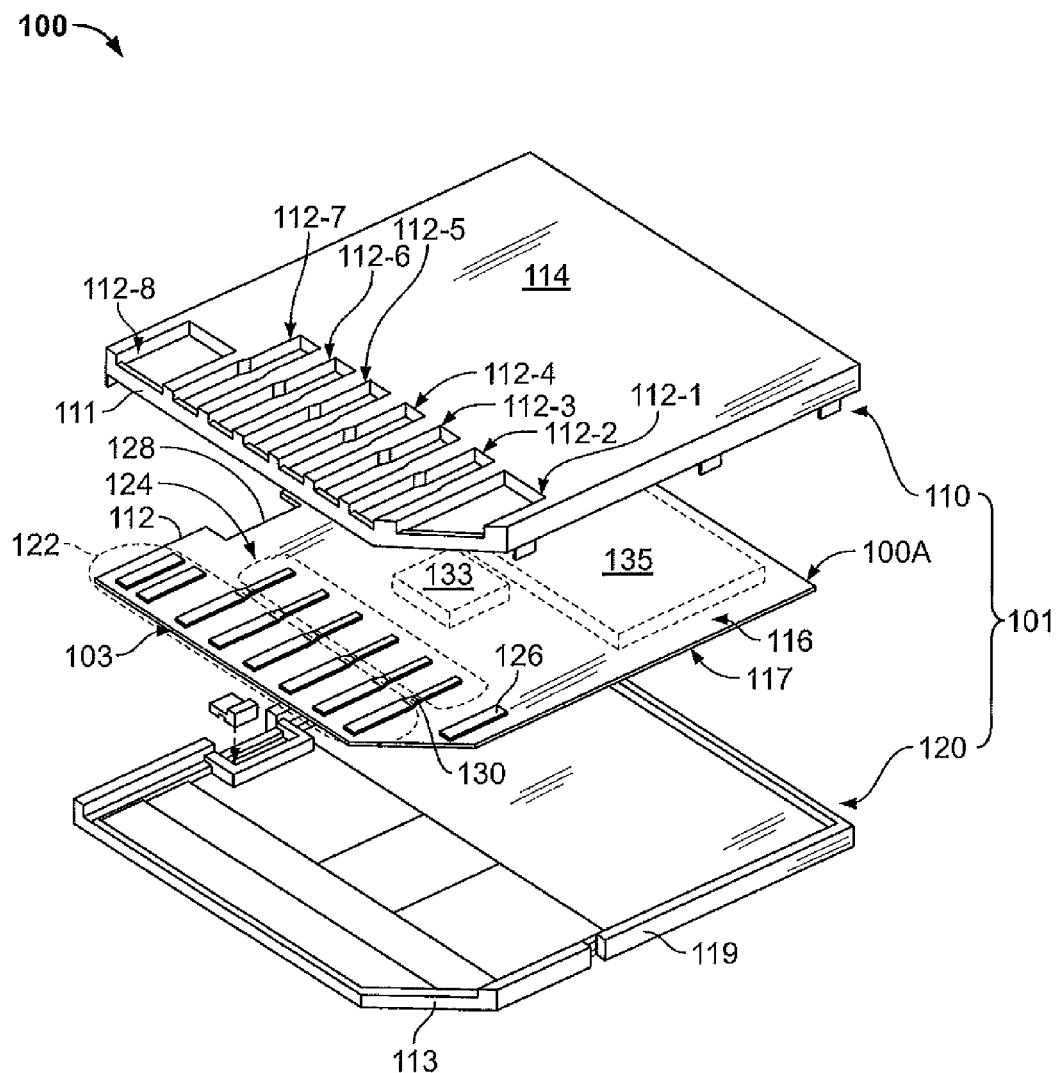
FIG. 3 depicts an exploded view of the multi-row memory card shown in FIG. 2.

FIGS. 2-3 illustrate assembled and exploded perspective views, respectively, showing a 14-finger memory card 100. Memory card 100 generally includes a printed circuit board (PCB) assembly 103 and a two-part housing 101. The housing 101 includes an upper cover 110 and a lower cover 120 that are mounted over PCB assembly 103 in the manner shown in FIG. 3. When assembled, the memory card 100 includes a leading edge 111, a trailing edge 115, a first side edge 115, a second side edge 119 and an angled edge 113 between the leading edge 111 and the second side edge 119.

According to an aspect of the present technology, PCB assembly 103 includes fourteen contact fingers arranged in a pattern consistent with MMC Specification Version 4.0, and housing 101 is formed with dimensions that comply with the SD form factor. By packaging PCB assembly 103 in SD-type housing 101 in the manner described below, the memory card 100 facilitates an efficient integrated SD/MMC card that recognizes and communicates with memory card connectors operating on either SD or MMC electronic protocols. The PCB assembly 103 and housing 101 are not limited to these two standards. By way of example only, the memory card 100 may also comprise a compact flash card, a microSD card, a miniSD card or an XD card.

The memory card 100 generally has two rows of contact fingers: a first row R1 of eight contact fingers 122 (122-1 through 122-8) and a second row R2 of five contacts fingers 124 (124-1 through 124-5). In FIG. 2, the second row of contact fingers 124-1 through 124-5 are each aligned with a corresponding contact finger 122 in the first row. An electrically insulating break 130 is located between each pair of contact fingers 122 and 124 in respective rows. In one embodiment, the each break 130 is formed during the photolithography step which defines the fingers 122 and 124. It is within the scope and spirit of the technology to form each break 130 by other methods.

By way of example only, the contact finger 122-1 is aligned with contact finger 124-1 (and the contact fingers 122-1 and 124-1 are separated by break 130-1); contact finger 122-2 is aligned with contact finger 124-2 (and the contact fingers 122-2 and 124-2 are separated by break 130-2); contact finger 122-3 is aligned with contact finger 124-3 (and the contact fingers 122-3 and 124-3 are separated by break 130-3); contact finger 122-5 is aligned with contact finger 124-4 (and the contact fingers 122-5 and 124-5 are separated by break 130-4; contact finger 122-6 is aligned with contact finger 124-5 (and the contact fingers 122-6 and 124-5 are separated by break 130-5). In an alternative embodiment, one or more of the contact fingers 124 in the second row R2 (124-1 through 124-5) are offset from the corresponding contact finger 122 in the first row R1 (122-1 through 122-6).

FIG. 2 illustrates that the second row R2 also includes a keyway 127. The keyway 127 is in the shape of a contact finger 124; however, the keyway 127 is not electrically connected to the PCB assembly 103 (e.g., does not provide an electrical signal path between the memory card 100 and the host device via the connector 200, explained hereinafter). In the FIG. 2 embodiment of the memory card 100, the contact finger 122-4 in the first row R1 is aligned with the keyway 127 in the second row R2. As will be described in more detail later, the keyway 127 is configured to accept a blocking feature 250 as the memory card 100 is inserted into the memory card connector 200. In an alternative embodiment, the keyway 127 may comprise a contact finger 124 that is electrically connected to the PCB assembly 103. If the memory card 100 includes a sixth contact finger 124, the contact finger 122-4 and the sixth contact finger (e.g., keyway 127) may be electrically insulated from each other (e.g., by etching). The memory card 100 shown in FIG. 2 also includes contact fingers 122-7 and 122-8 in the first row R1 and a fourteenth contact finger 126.

The top cover 110 of the memory card 100 is formed with openings 112. The openings 112 allow the first row R1 of contact fingers 122-1 through 122-8, the second row R2 of contacts fingers 124-1 through 124-5, the keyway 127 and the contact finger 126 to be exposed when the memory card 100 is assembled. FIG. 3 illustrates that the top cover 110 includes openings 112-1 through 112-8. The cover 110, when placed over the PCB assembly 103, forms a second beveled edge 132 at one end of each contact finger 124 and the keyway 127 (end furthest from the leading edge 111). Accordingly, each contact finger 122 and 124, and the keyway 127, are recessed below the surface of the cover 110.

FIG. 3 illustrates that PCB assembly 103 includes a printed circuit board PCB 101 having fourteen contact fingers formed on an upper surface 116, and one or more integrated circuits (ICs) 133 and 135 (indicated by dashed lines) mounted on a lower surface 117. The ICs 133 and 135 may be fabricated in accordance with many different integrated circuit protocols. By way of example only, the ICs 133 and 135 may be in accordance with either the SD or MMC protocols, thereby providing a single memory card structure that can be used to produce either SD or MMC memory cards.

Figure 4:
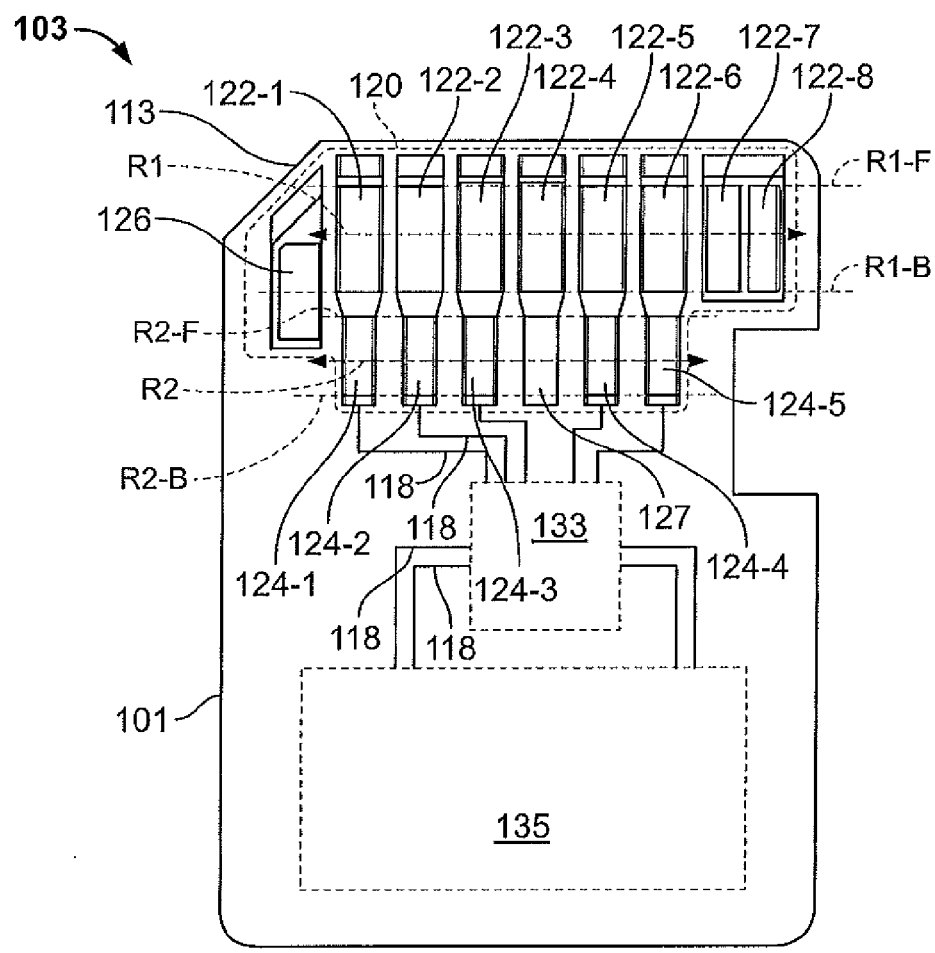
FIG. 4 depicts a plan view of the printed circuit board assembly of the multi-row memory card shown in FIG. 2.

FIG. 4 illustrates a top plan view showing PCB assembly 103 in additional detail. PCB 101 is formed in accordance with known PCB manufacturing techniques such that the contact fingers 122 and 124 and ICs 130 and 135 (as well as other circuit components, which are omitted for brevity) are electrically interconnected by a predefined network of conductive traces 118 (only a few of which are shown for illustrative purposes).

The first row R1 of contact fingers 122 are parallel to leading edge 111 and the second row R2 of contact fingers 124 are parallel to first row R1. The first row R1 of contact fingers 122 includes a first contact finger 122-1 that is located adjacent to an intersection of leading edge 111 and chamfer edge 113, an eighth contact finger 122-8 that is located adjacent to first side edge 112, and six intermediate contact fingers 122-2, 122-3, 122-4, 122-5, 122-6 and 122-7 respectively arranged between first contact finger 122-1 and eighth contact finger 122-8. Each of the contact fingers 122 includes a front end (end closest to R1-F) and a back end (end closest to R1-B). Each of the contact fingers 124 includes a front end (end closest to R2-F) and a back end (end closest to R2-B). In one embodiment, contact fingers 122-1 through 122-8 each define rectangular regions that are approximately 5 mm in length and 1.3 mm in width and contact fingers 124-1 through 124-5 define rectangular regions that are approximately 3 mm in length and 1.3 mm in width. The size of the contact fingers 122 and 124 are not limited to these dimensions.

Referring back to FIG. 3, the two-part housing of the memory card 100 is connected together over PCB assembly 103 such that contact fingers 122 in the first row R1, the contact fingers 124 in the second row R2 and the fourteenth contact finger 126 are exposed through the cover 110 to allow coupling to a host system when memory card 100 is inserted into the memory card connector 200.

Figure 5:
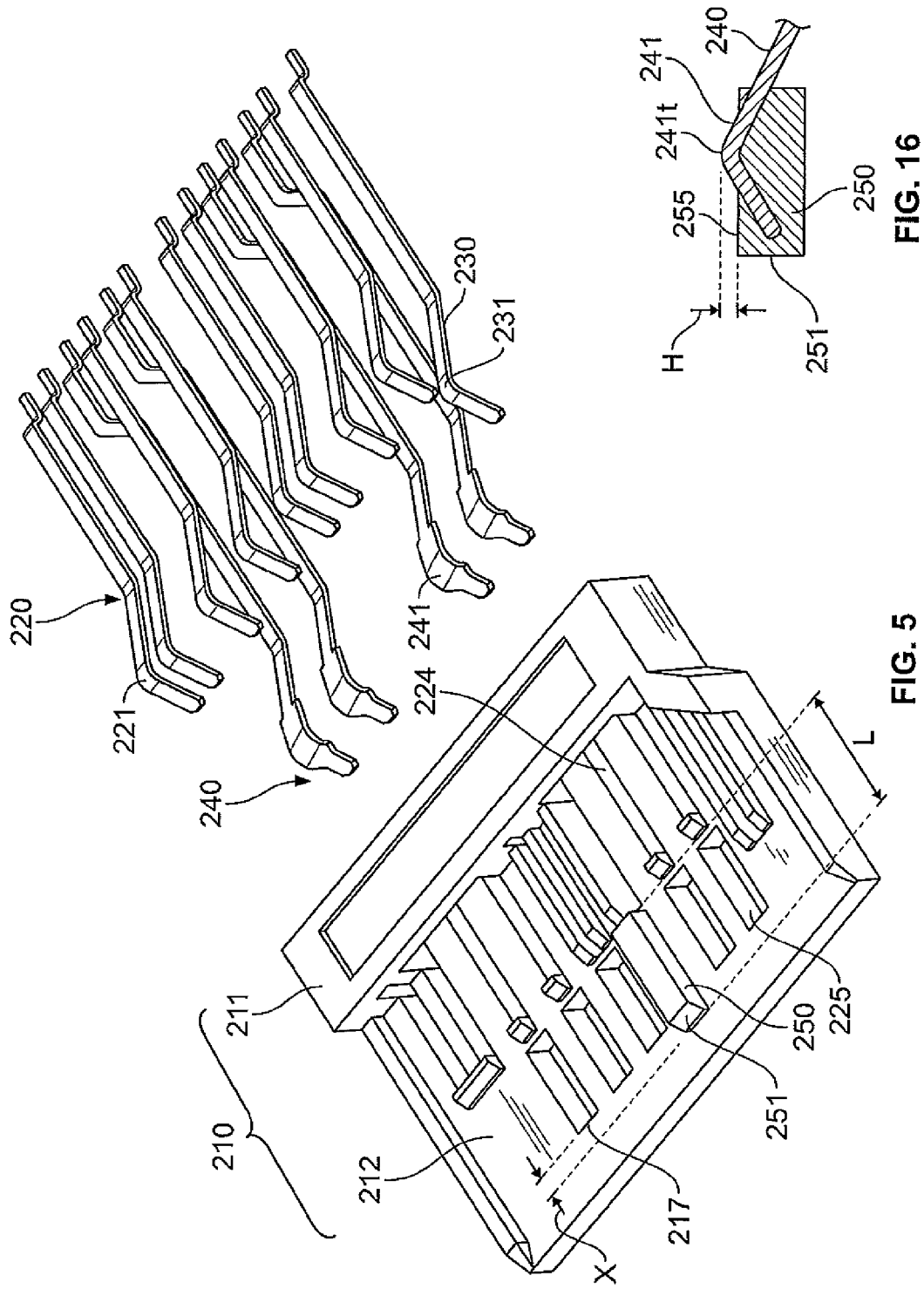
FIG. 5 depicts an isometric assembly view of an embodiment of a memory card connector.
Figure 6:
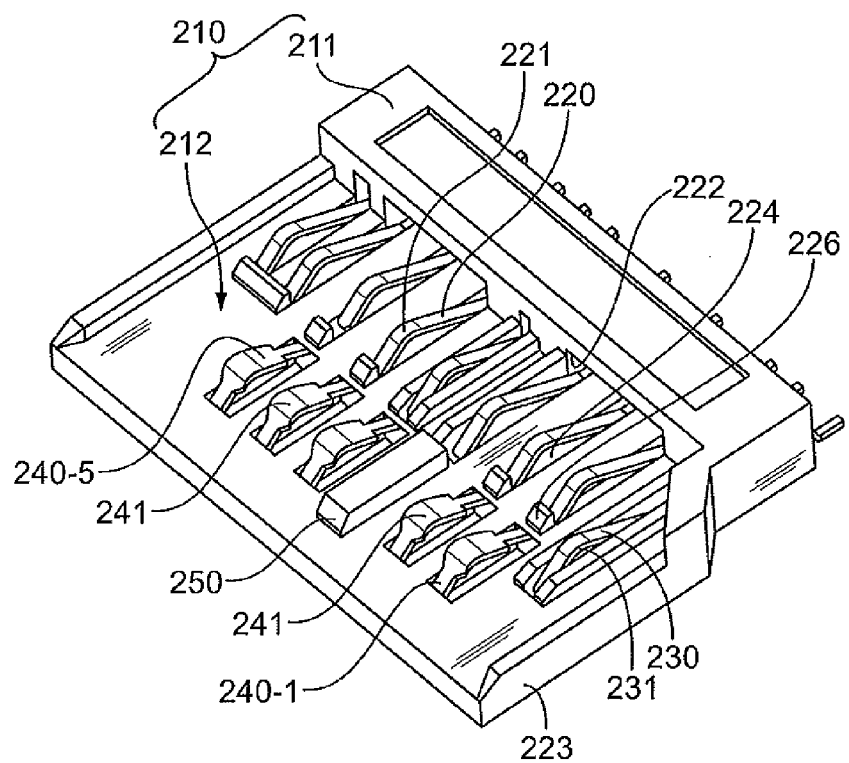
FIG. 6 depicts an isometric view of the memory card connector shown in FIG. 5.
Figure 7:
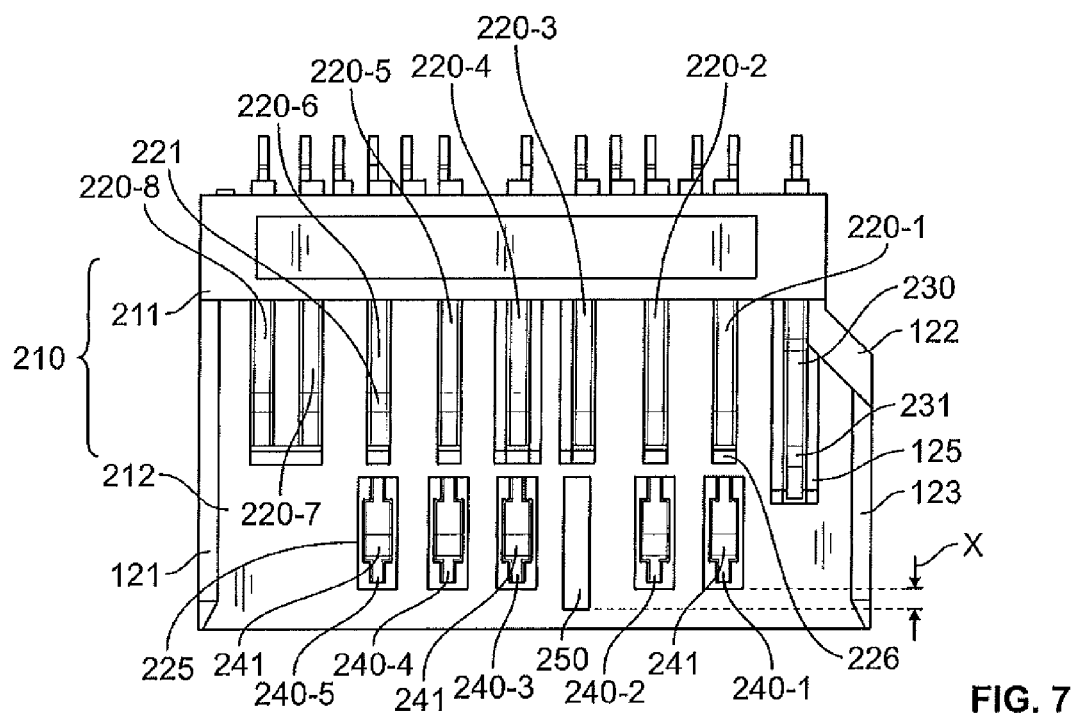
FIG. 7 depicts a plan view of the memory card connector shown in FIG. 6.

FIGS. 5-7 illustrate one embodiment of a memory card connector 200, which has a main body 210 and three different groups of contact pins 220, 230, 240. Connector 200 may be mounted within a slot if a host device for interfacing the memory card 100 with the host device, as explained hereinafter. FIG. 5 illustrates that the main body 210 includes an internal portion 211 and an external receptacle 212. The external receptacle 212 includes a first group of recesses 224 for receiving the contact pins 220 and 230, a second group of recesses 225 for receiving the contact pins 240 and a blocking feature 250.

The first group of contact pins 220 has eight contact pins (220-1 through 220-8). Each of the eight contact pins 220 extend through the main body 210 via the grooves 224. Each of the contact pins 220 includes a flexible bent portion 221, which is received within the corresponding recesses 224, respectively.

The second group of contact pins 230 has only one contact pin 230, which is disposed in close vicinity to the inner wall of the second and third side walls 222, 223 of the main body 210. The contact pin 230 is inserted through the housing 210 via one of the grooves 224 while the external side thereof is substantially formed to be a flexible bent portion 231.

The third group of contact pins 240 has five contact pins (240-1 through 240-5). Each of the contact pins 240 has a flexible bent portion 241 at the external side. The bent portions 241 of the contact pins 240 extend beyond the bent portions 221 of the first contact pins 220, and are received within the corresponding recesses 225.

The groups of the contact pins 220, 230, 240 have a total of fourteen contact pins that are arranged on the surface of the main body 210. All of the flexible bent portions 221, 231, 241 have a top surface located at a higher position than the first and third side walls 223, 225. The contact pin 240-1 is aligned with contact pin 220-1; contact pin 240-2 is aligned with contact pin 220-2; contact pin 240-3 is aligned with contact pin 220-4; contact pin 240-4 is aligned with contact pin 220-5; and contact pin 240-5 is aligned with contact pin 220-6.

The blocking feature 250 has a front face 251, a rear face 253 and a length L. FIG. 5 illustrates that the blocking feature 250 is oriented substantially parallel to the recesses 225 in the external receptacle 212. However, FIG. 5 illustrates that the front face 251 of the blocking feature 250 may be set slightly forward (further away from the internal portion 211) of the distal end 217 of each recess 225. This forward offset is shown in FIG. 5 as the distance x. In one embodiment, the offset distance x comprises between 1 mm and 5 mm. However, the offset distance x may comprise other distances. In an alternative embodiment, the face 251 of the blocking feature 250 is not offset forward from the distal end 217 of the recesses 225 (e.g., distance x shown in FIG. 5 equals 0 mm). In yet another alternative embodiment, the face 251 of the blocking feature 250 is slightly recessed back from the distal end of the recesses 225.

FIGS. 6-7 illustrate that the length L of the blocking feature 250 is substantially parallel to the bent portion 241 of each contact pin 240. In FIGS. 6-7, the blocking feature 250 is located in the second group of contact pins 240 between contact pin 240-2 and contact pin 240-3. As will be discussed in more detail later, the blocking feature 250 may be located in other positions and the memory card connector 200 may have more than one blocking feature 250. The blocking feature 250 may be formed integrally as part of the main body 210 or affixed to main body 210 after body 210 is fabricated. The blocking feature 250 may comprise, by way of example only, metal or an electrically insulating material such as plastic, high-temperature nylon or a thermoplastic polymer.

Figure 8:
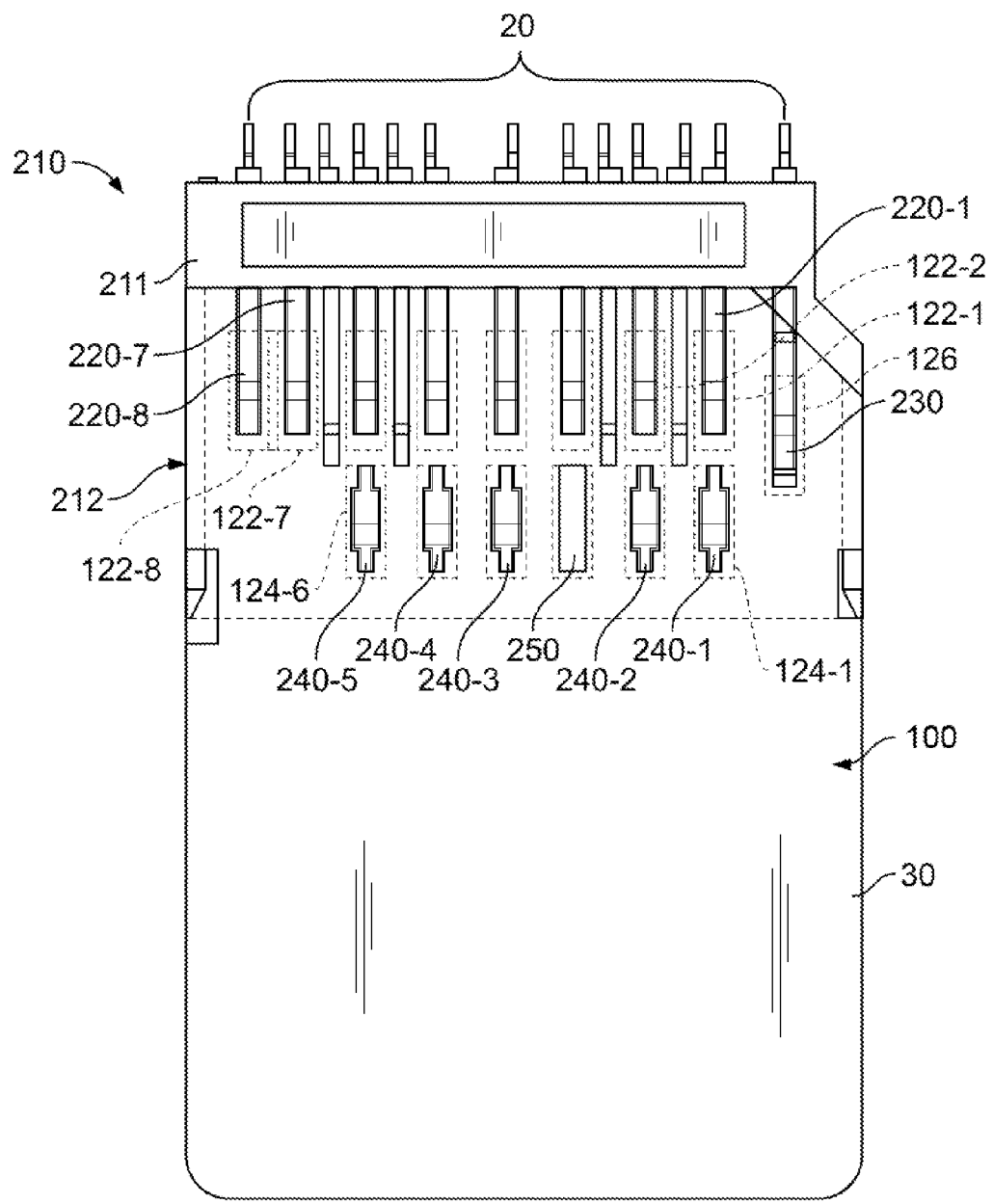
FIG. 8 depicts a plan view of the memory card connector with multiple-row memory card inserted into the memory card connector.

The use of the memory card 100 and the main body 210 is detailed by the accompanying FIG. 8. FIG. 8 illustrates the memory card 100 fully inserted in the memory card connector 200. When fully inserted into the connector 200, the fourteen contact fingers on the memory card 100 establish an electric connection with all of the fourteen contact pins 220, 230, 240 of the connector 200. In the first group of contact pins 220, contact pin 220-1 is mated with contact finger 122-1; contact pin 220-2 is mated with contact finger 122-2; contact pin 220-3 is mated with contact finger 122-3; contact pin 220-4 is mated with contact finger 122-4; contact pin 220-5 is mated with contact finger 122-5; contact pin 220-6 is mated with contact finger 122-6; contact pin 220-7 is mated with contact finger 122-7; and contact pin 220-8 is mated with contact finger 122-8. Each of the contact fingers 240 is mated with a contact finger 124. Contact finger 240-1 is mated with contact finger 124-1; contact finger 240-2 is mated with contact finger 124-1; contact finger 240-3 is mated with contact finger 124-3; contact finger 240-4 is mated with contact finger 124-4; and contact finger 240-5 is mated with contact finger 124-5. The blocking feature 250 is mated with keyway 127.

Figure 9:
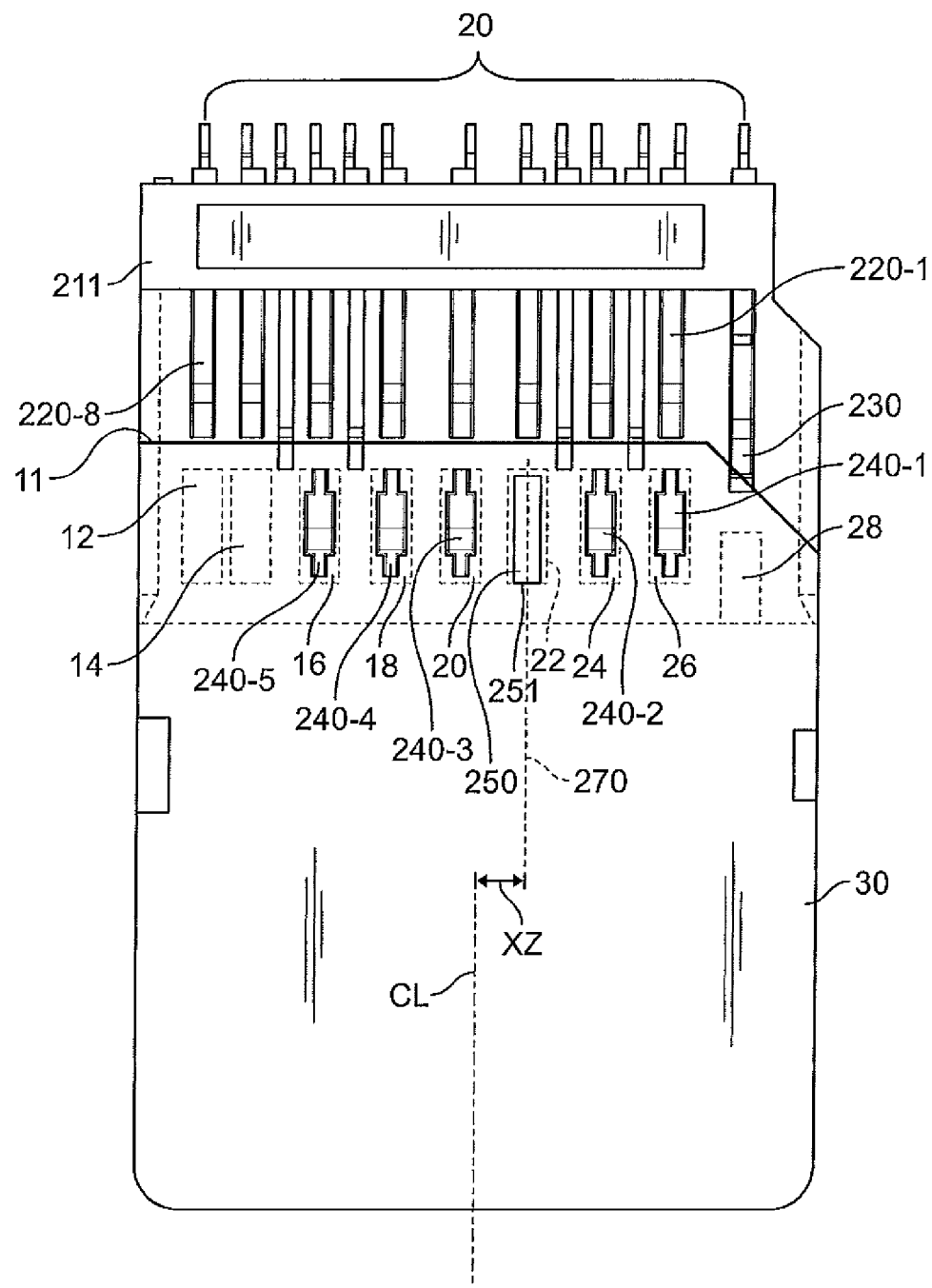
FIG. 9 depicts a plan view of the memory card connector with a single-row memory card inserted into the memory card connector.

FIG. 9 illustrates the conventional SD memory card 10 inserted into the memory card connector 200. When the memory card 10 is initially inserted into the connector, the blocking feature 250 mates with or occupies the contact finger 22. As the memory card 10 is further inserted into the connector 200, the blocking feature 250 slides across the contact finger 22 until the front face 251 of the blocking feature 250 abuts the beveled edge 29 of the card housing 30. At this point, the memory card 10 is prevented from being further inserted into the connector 200.

Figure 1:
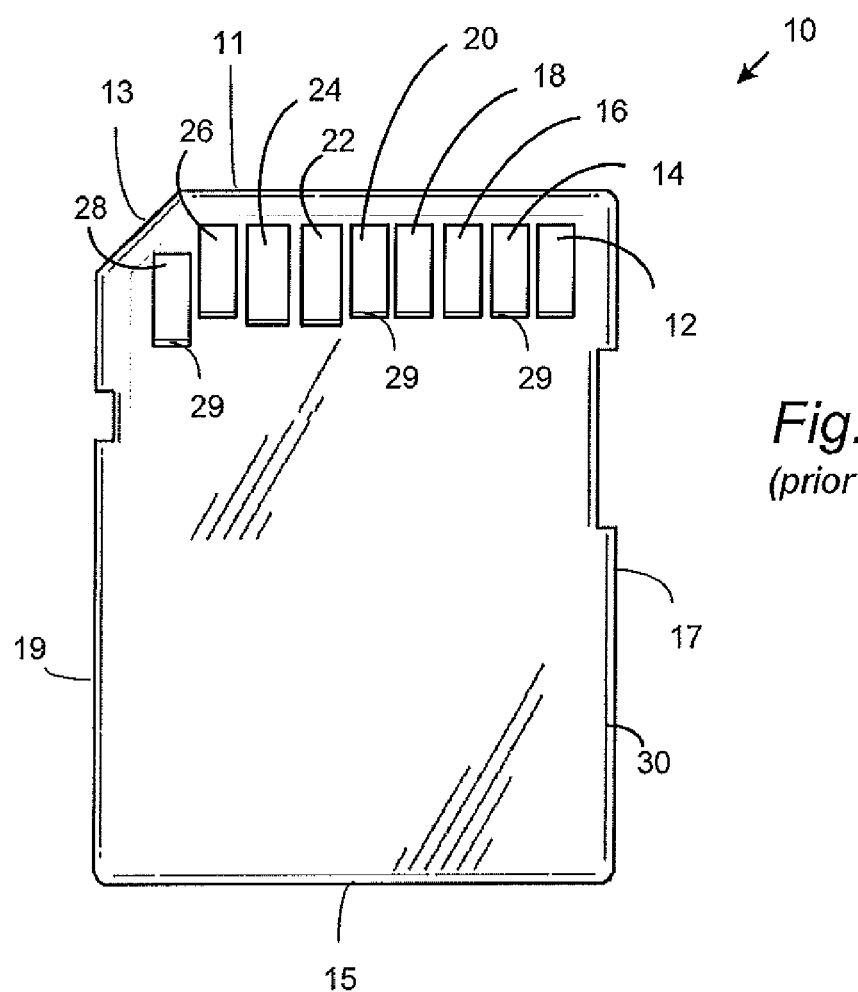
FIG. 1 depicts a plan view of single row memory card, according to the prior art.

Even though the memory card 10 is not fully inserted into the connector 200, the contact pins 240 of the connector 200 mate with several of the contact fingers of the memory card 10. Using the memory card 10 shown in FIG. 1, the contact pin 240-1 mates with the contact finger 26; the contact pin 240-2 mates with the contact finger 24; the contact pin 240-3 mates with the contact finger 20; the contact pin 240-4 mates with the contact finger 18; and the contact pin 240-5 mates with the contact finger 16.

Not allowing the memory card 10 to insert further into the connector 200 prevents the memory card 10 for damaging any of the contact pins 220 in the first row R1 or the contact pins 240 in the second row R2. The blocking feature 250 prohibits the insertion of the memory card 10 any further than that shown in FIG. 9. In particular, the bent portions 241 of the contact pins 240 do not engage or contact the beveled edge 29 of the memory card housing 30. Similarly, the blocking feature 250 prevents the leading edge 11 of the memory card 10 from contacting the bent portion 231 of the contact pins 220. A blocking feature 250 that occupies either contact finger 20 or 22 of the memory card 10 (when the memory card 10 is inserted into the connector 200) provides a substantially central pivot point, created by the face 251 of the blocking feature 250 and the beveled edge 29 of the memory card 10 that the blocking feature 250 is abutted against.

Using the example shown in FIG. 9 (whereby the blocking feature occupies contact finger 22), the memory card 10 will attempt to rotate about the blocking feature 250 within the connector 200 along an axis 270 when the face 251 of the blocking feature 250 abuts against the beveled edge 29 of the housing 30. FIG. 9 illustrates that the axis 270 is offset from the horizontal centerline CL of the memory card 10 by a distance X2. If the slot in the connector 200 (not shown) was slightly wider than the card 10, the card 10 could rotate slightly within the connector 200. If a user inserts the card 10 into the connector 200 and pushes the trailing edge 15 of the card to the left of the centerline CL (from the perspective of the plan view show in FIG. 9), the left corner of leading edge 11 may be able to move slightly further into the connector 200 than shown in FIG. 9. If the leading edge 11 of the card 10 moves too much further into the connector 200 as shown in FIG. 9, the leading edge 11 may contact and damage one or more of the contact pins 220. It is within the scope of the invention for the blocking feature 250 to occupy any of the other contact fingers 240.

Figure 10:
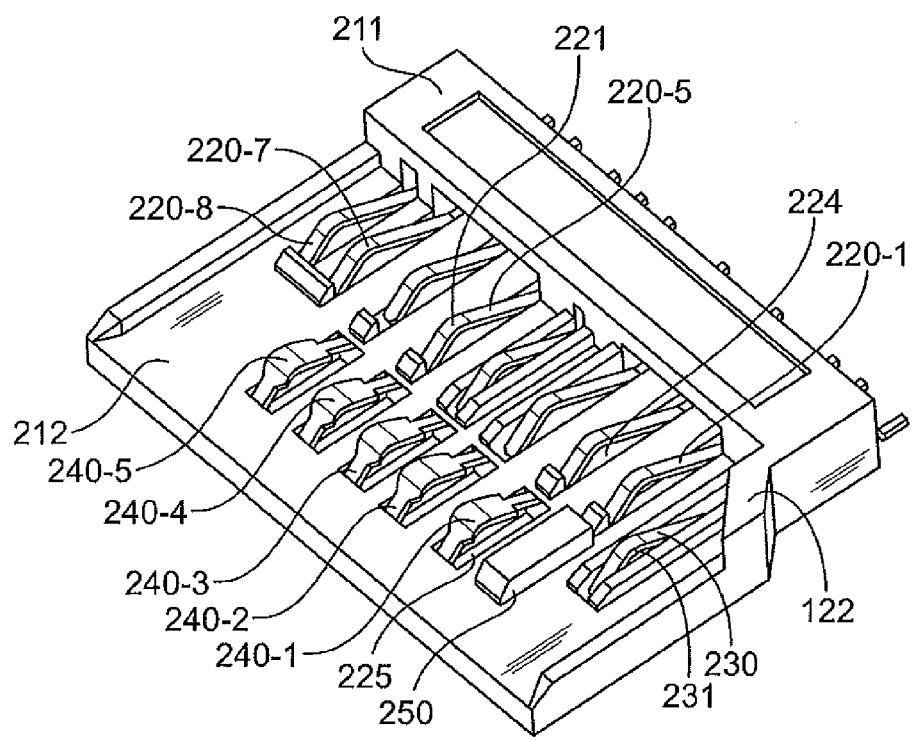
FIG. 10 depicts an isometric view of another embodiment of a memory card connector.
Figure 11:
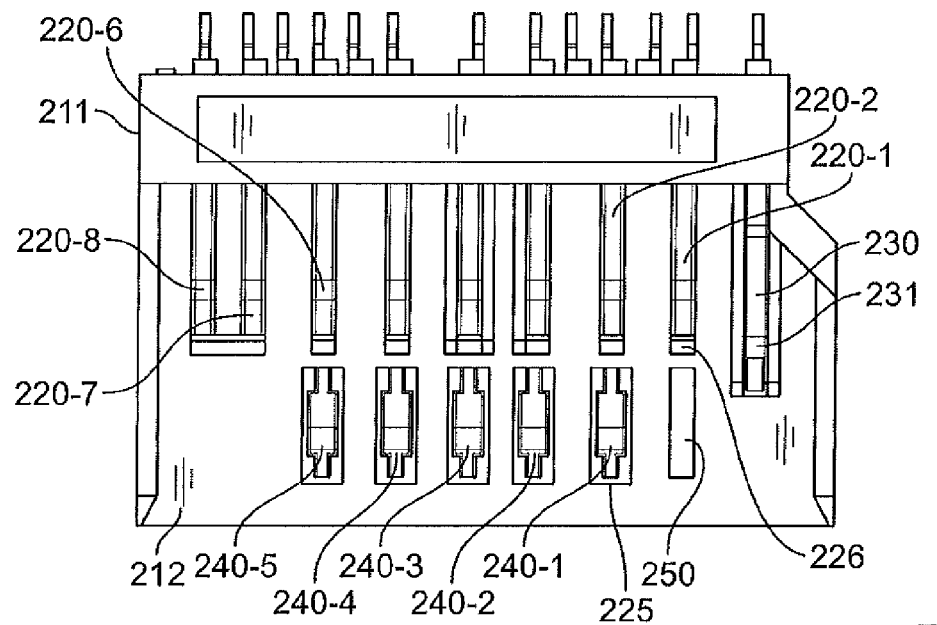
FIG. 11 depicts a plan view of the memory card connector shown in FIG. 10.

FIGS. 10-11 illustrate another embodiment of the memory card connector 200. In this embodiment, the memory card connector 200 includes a single blocking feature 250. However, the blocking feature 250 is located in a different position in the second row of contact pins 240 that shown in FIGS. 6-7. Here, the blocking feature 250 is located in the second row of contact pins 240 to the right of contact pin 240-1 (as seen from the plan view of FIG. 11), and is aligned with contact pin 220-1.

If the blocking feature 250 is located in the position shown in FIGS. 10-11, the memory card connector 200 would still prevent a conventional memory card 10 from being fully inserted into the connector 200, which would damage the contact pins 220. As a conventional memory card 10 is inserted into the connector 200, the blocking feature 250 would mate with the contact finger 26 and slide across the contact finger 26 until the blocking feature 250 abutted the raised beveled edge of the housing 30. It is understood that the blocking feature 250 may be positioned in the place of other contact pins 240 in the second row R2 in further embodiments.

Figure 12:
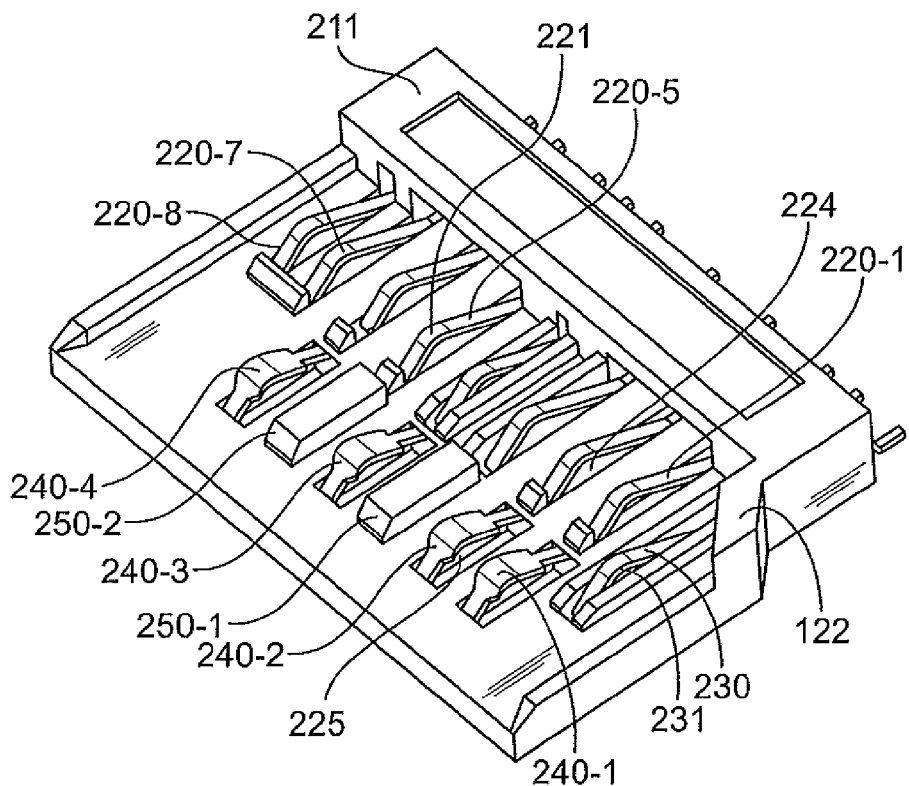
FIG. 12 depicts an isometric view of another embodiment of a memory card connector.
Figure 13:
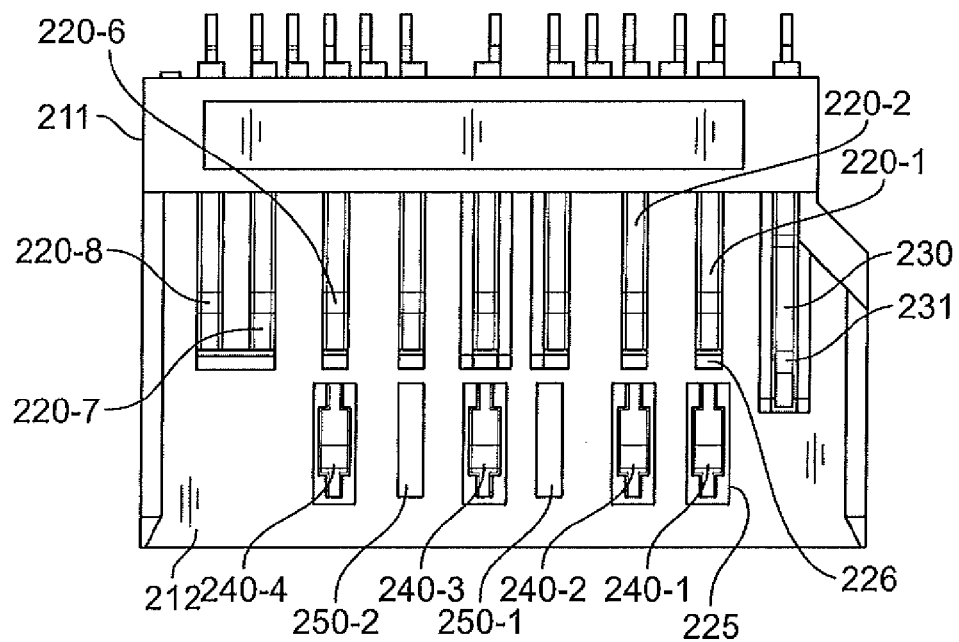
FIG. 13 depicts a plan view of the memory card connector shown in FIG. 11.

FIGS. 12-13 illustrate another embodiment of the memory card connector 200. In this embodiment, the memory card connector 200 has two blocking features 250-1 and 250-2. The first blocking feature 250-1 is shown located between contact pin 240-2 and contact pin 240-3. The second blocking feature 250-2 is shown located between contact pin 240-3 and contact pin 240-4. The two blocking features 250 may be, of course, located elsewhere in the row of contact pins 240. The second blocking feature 250-2 provides additional support for preventing the memory card 10 from inserting into the connector 200 beyond that shown in FIG. 9. As discussed above, the blocking features 250-1 and 250-2 may be offset forward, recessed from or even with the bent portion 241 of the contact pins 240.

With a single blocking feature 250, the housing 30 of the memory card 10 will attempt to pivot about the blocking feature 250. If the memory card 10 pivots clockwise or counterclockwise (from the perspective of FIG. 13) too much, the housing 30 may contact and damage one of the contact pins 240 in the second row R2 of the connector 200. The additional blocking feature 250-2 provides a second point of contact with the housing 30 of the memory card 10, which will prevent the card 10 from pivoting within the connector 200.

Figure 14:
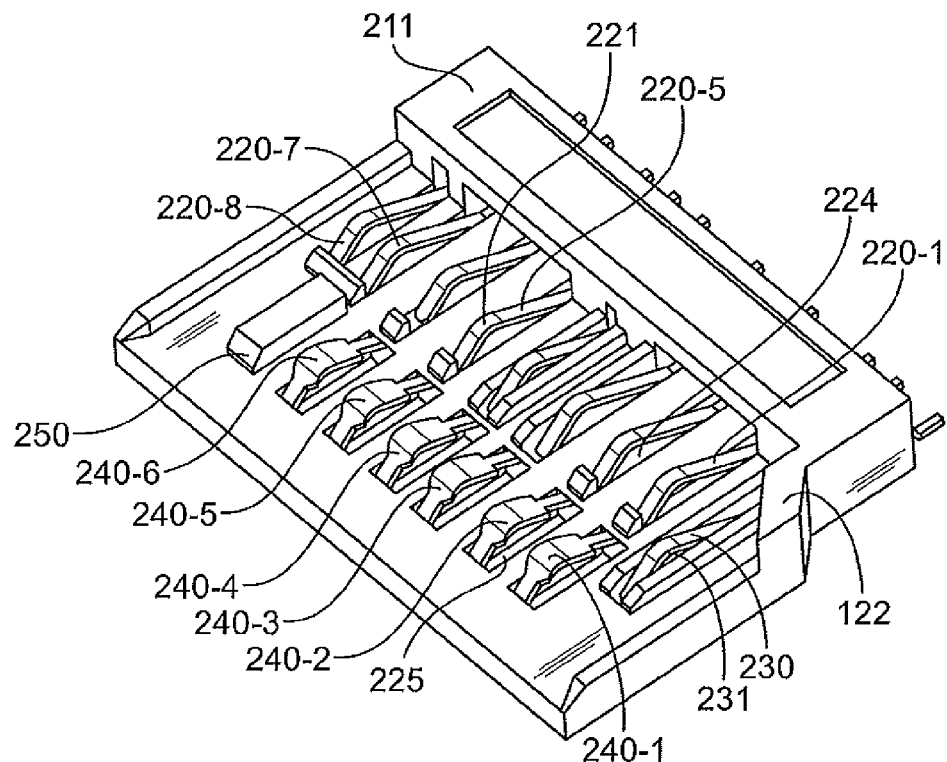
FIG. 14 depicts an isometric view of another embodiment of a memory card connector.
Figure 15:
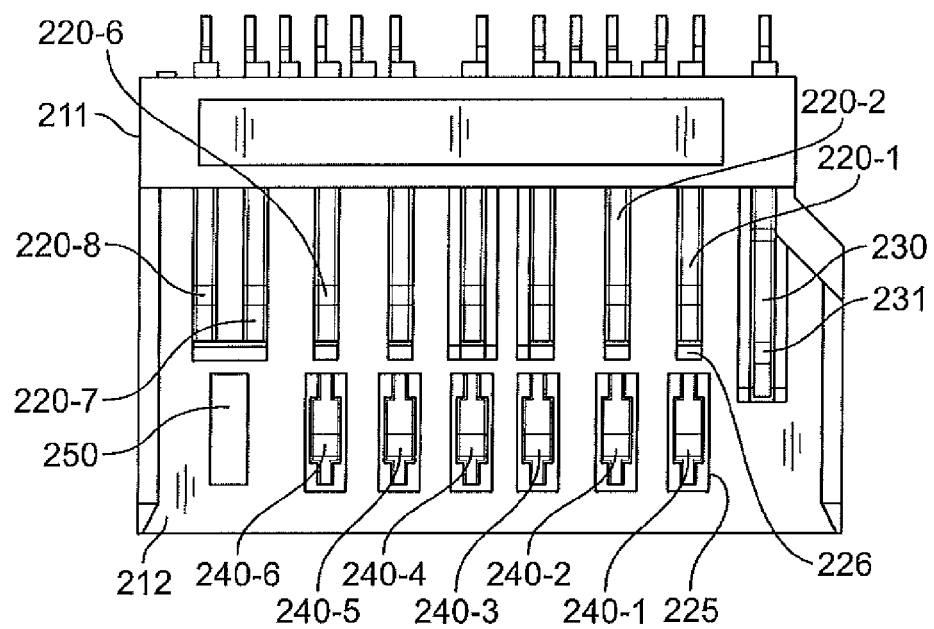
FIG. 15 depicts a plan view of the memory card connector shown in FIG. 14.

FIGS. 14-15 illustrate another embodiment of the memory card connector 200. In this embodiment, the blocking feature 250 is located adjacent to the contact pin 240-6 and is aligned substantially between contact pins 220-7 and 220-8. One advantage of the placement of the blocking feature 250 in FIGS. 14-15 is that the blocking feature 250 does not replace or occupy the space of a contact pin 240. Thus, the memory card connector 200 could include a sixth contact pin 240-6, allowing electrical signals to pass between the connector 200 and the memory card 100 via all six contact fingers 122-1 through 122-6 of the memory card 100. The memory card 100, in order to accommodate the blocking feature 250 in the location shown in FIGS. 14-15, may include a keyway 127 in the cover 110 that receives the blocking feature 250 (location of keyway shown is dashed-lines as keyway 129 in FIG. 2).

The position of the blocking feature 250 in the second row of contact pins 240 shown in FIGS. 6-15 are exemplary. The blocking feature 250 (or features) may be located anywhere in, or adjacent to, the second row of contact pins 240 of the connector 200.

FIG. 16 illustrates an alternative embodiment of the blocking feature 250. In this alternative embodiment, the blocking feature 250 partially encases a contact pin 240 in the second row R2 of the connector 200. The bent portion 241 of the contact pin 240 extends slightly out of the blocking feature 250 such that the tip 241t is raised a height h above the top surface 255 of the blocking feature 250. This way, the bent portion 241 of the contact pin 240 contacts the corresponding contact finger of the memory card 100 when the card 100 is inserted into the connector 200 and forms an electrical connection with the contact finger 240. As shown in FIGS. 6-13, one of the contact pins 240 is replaced with the blocking feature 250. A blocking feature 250 with the bent portion 241 partially extending out of the top surface 255 of the blocking feature allows the connector 200 to have a full complement of contact pins 240. In other words, one of the contact pins 240 does not have to be replaced with the blocking feature 250. This allows the keyway to be replaced by a functional contact pin in memory card 100. The blocking features 250 shown in FIG. 16 may partially encase any of the contact pins 240 of the connector 200, and may encase more than one contact finger 240.

The FIG. 16 embodiment of the blocking feature 250 still prevents a conventional memory card 10 from being fully inserted into the connector 200 and damaging a contact pin 220. As the memory card 10 is inserted into the connector 200, the blocking feature 250 mates with a contact finger of the memory card 10 and the front face 251 of the blocking feature 250 will eventually abut the beveled edge 29 of a contact finger.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for interfacing first and second memory cards with a host device via a memory card connector, the memory card connector having a first row of contact pins, a second row of contact pins and a blocking element, the first memory card having a single row of slots, at least some of the slots comprising a contact pin, the second memory card having a first row of slots and a second row of slots, at least some of the slots in the first and second rows comprising a contact pin, the method comprising the steps of:
   (a) accepting the second memory card such that the first row of contact pins engage the first row of slots, and the second row of contact pins engage the second row of slots; and
   (b) accepting the first memory card until the blocking element abuts against a distal end of one of the slots in the single row of slots.

2. The method as recited in claim 1, wherein step (a) of accepting the second memory card, wherein the first row of slots comprises a first row of contact fingers and the second row of slots comprises a second row of contact fingers and a keyway, comprises the step of receiving the second memory card until:
   (i) each contact pin in the first row of contact pins forms an electrical connection with the corresponding contact finger in the first row of contact fingers;
   (ii) each contact pin in the second row of contact pins forms an electrical connection with the corresponding contact finger in the second row of contact fingers; and
   (iii) the blocking element mates with the keyway.

3. The method as recited in claim 1, wherein step (b) of accepting the first memory card, wherein the single row of slots comprises a first row of contact fingers each having a distal end, comprises the step of receiving the first memory card until:
   (i) each contact pin in the second row of contact pins forms an electrical connection with a corresponding contact finger in the single row of contact fingers; and
   (ii) the blocking element abuts the distal end of one of the contact fingers in the single row of contact fingers.

4. The method as recited in claim 1, wherein step (b) of accepting the first memory card, wherein the single row of slots comprises a first row of contact fingers each having a distal end, comprises the step of receiving the first memory card until the blocking element abuts the distal end of one of the contact fingers in the single row of contact fingers.

5. The method as recited in claim 1, wherein step (b) of accepting the first memory card, wherein the single row of slots comprises a first row of contact fingers each having a distal end, comprises the step of receiving the first memory card until the blocking element abuts the distal end of one of the contact fingers in the single row of contact fingers, which occurs before the contact pins in the second row of contact pins abut the distal end of a contact finger in the first row of contact pins.

6. The method as recited in claim 1, wherein the blocking element partially encases one of the contact pins in the second row of contact pins.

7. The method as recited in claim 1, wherein step (a) of accepting the second memory card, wherein the first row of slots comprises a first row of contact fingers and the second row of slots comprises a second row of contact fingers, comprises the step of receiving the second memory card until:
   (i) each contact pin in the first row of contact pins forms an electrical connection with the corresponding contact finger in the first row of contact fingers;
   (ii) each contact pin in the second row of contact pins forms an electrical connection with the corresponding contact finger in the second row of contact fingers; and
   (iii) the blocking element mates with one of the contact fingers in the second row of contact fingers.

8. The method as recited in claim 2, wherein step (a)(iii) of receiving the second memory card until the blocking element occupies one of the contact fingers in the second row of contact fingers comprises the steps of:
   providing a contact pin within the blocking element, wherein the contact pin is partially exposed; and
   receiving the second memory card until the contact pin forms an electrical connection with the contact finger that the blocking element is occupying.

9. A method for preventing a legacy memory card from connecting to a ultra high-speed memory card connector, the legacy memory card having a single row of contact fingers each with a distal end, the method comprising the steps of:
   (a) providing a memory card connector having a first row of contact pins, a second row of contact pins and a blocking element;
   (b) accepting the legacy card into the memory card connector until the blocking element abuts against the distal end of one of the contact fingers of the legacy memory card, wherein the blocking element abuts against a portion of a legacy card housing adjacent the distal end of the contact finger of the legacy card before any of the contact pins in the second row of contact pins abut against the distal end of a corresponding contact finger.

10. The method as recited in claim 9, wherein the blocking element partially encases one of the contact pins in the second row of contact pins in the memory card connector.

11. A method for interfacing first and second memory cards with a host device via a memory card connector, the memory card connector having a first row of contact pins, a second row of contact pins and a blocking element, the first memory card having a single row of slots, at least some of the slots comprising a contact pin, the second memory card having a first row of slots and a second row of slots, at least some of the slots in the first and second rows comprising a contact pin, the method comprising the steps of:
- (a) accepting the second memory card such that the first row of contact pins engage the first row of slots, and the second row of contact pins engage the second row of slots; and
- (b) accepting the first memory card until the blocking element abuts against a distal end of one of the slots in the single row of slots.

12. The method as recited in claim 11, wherein step (a) of accepting the second memory card, wherein the first row of slots comprises a first row of contact fingers and the second row of slots comprises a second row of contact fingers and a keyway, comprises the step of receiving the second memory card until:
- (i) each contact pin in the first row of contact pins forms an electrical connection with the corresponding contact finger in the first row of contact fingers;
- (ii) each contact pin in the second row of contact pins forms an electrical connection with the corresponding contact finger in the second row of contact fingers; and
- (iii) the blocking element mates with the keyway.

13. The method as recited in claim 11, wherein step (b) of accepting the first memory card, wherein the single row of slots comprises a first row of contact fingers each having a distal end, comprises the step of receiving the first memory card until:
- (i) each contact pin in the second row of contact pins forms an electrical connection with a corresponding contact finger in the single row of contact fingers; and
- (ii) the blocking element abuts the distal end of one of the contact fingers in the single row of contact fingers.

14. The method as recited in claim 11, wherein step (b) of accepting the first memory card, wherein the single row of slots comprises a first row of contact fingers each having a distal end, comprises the step of receiving the first memory card until the blocking element abuts the distal end of one of the contact fingers in the single row of contact fingers.

15. The method as recited in claim 11, wherein step (b) of accepting the first memory card, wherein the single row of slots comprises a first row of contact fingers each having a distal end, comprises the step of receiving the first memory card until the blocking element abuts the distal end of one of the contact fingers in the single row of contact fingers, which occurs before the contact pins in the second row of contact pins abut the distal end of a contact finger in the first row of contact pins.

16. The method as recited in claim 11, wherein the blocking element partially encases one of the contact pins in the second row of contact pins.

17. The method as recited in claim 11, wherein step (a) of accepting the second memory card, wherein the first row of slots comprises a first row of contact fingers and the second row of slots comprises a second row of contact fingers, comprises the step of receiving the second memory card until:
- (i) each contact pin in the first row of contact pins forms an electrical connection with the corresponding contact finger in the first row of contact fingers;
- (ii) each contact pin in the second row of contact pins forms an electrical connection with the corresponding contact finger in the second row of contact fingers; and
- (iii) the blocking element mates with one of the contact fingers in the second row of contact fingers.

18. The method as recited in claim 12, wherein step (a)(iii) of receiving the second memory card until the blocking element occupies one of the contact fingers in the second row of contact fingers comprises the steps of:
- providing a contact pin within the blocking element, wherein the contact pin is partially exposed; and
- receiving the second memory card until the contact pin forms an electrical connection with the contact finger that the blocking element is occupying.

19. A method for preventing a legacy memory card from connecting to a ultra high-speed memory card connector, the legacy memory card having a single row of contact fingers each with a distal end, the method comprising the steps of:
- (a) providing a memory card connector having a first row of contact pins, a second row of contact pins and a blocking element;
- (b) accepting the legacy card into the memory card connector until the blocking element abuts against the distal end of one of the contact fingers of the legacy memory card, wherein the blocking element abuts against a portion of a legacy card housing adjacent the distal end of the contact finger of the legacy card before any of the contact pins in the second row of contact pins abut against the distal end of a corresponding contact finger.

20. The method as recited in claim 19, wherein the blocking element partially encases one of the contact pins in the second row of contact pins in the memory card connector.

* * * * *